United States Patent
Ahmari

(10) Patent No.: US 11,851,995 B2
(45) Date of Patent: *Dec. 26, 2023

(54) SMART CHOKE VALVE TO REGULATE WELL SAND PRODUCTION

(71) Applicant: Saudi Arabian Oil Company, Dhahran (SA)

(72) Inventor: Abdulrahman Ahmari, Dhahran (SA)

(73) Assignee: Saudi Arabian Oil Company, Dhabran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/674,545

(22) Filed: Feb. 17, 2022

(65) Prior Publication Data

US 2022/0170351 A1    Jun. 2, 2022

Related U.S. Application Data

(63) Continuation of application No. 15/930,895, filed on May 13, 2020, now Pat. No. 11,333,010.

(51) Int. Cl.
*E21B 43/12* (2006.01)
*E21B 34/02* (2006.01)
*G05D 7/06* (2006.01)
*E21B 47/06* (2012.01)

(52) U.S. Cl.
CPC ............ *E21B 43/12* (2013.01); *E21B 34/025* (2020.05); *G05D 7/0623* (2013.01); *E21B 47/06* (2013.01)

(58) Field of Classification Search
CPC .... E21B 34/025; E21B 43/12; E21B 49/0875; E21B 41/00
See application file for complete search history.

(56) References Cited

U.S. PATENT DOCUMENTS

| 2,601,654 A | 6/1952 | Wright |
| 4,630,675 A | 12/1986 | Neipling et al. |
| 6,814,142 B2 | 11/2004 | Paulk et al. |

(Continued)

FOREIGN PATENT DOCUMENTS

| CN | 101289971 B | 10/2008 |
| CN | 108825167 A | 11/2018 |

(Continued)

OTHER PUBLICATIONS

Alajmi, Mohammed D. et al.; "Improving Multiphase Choke Performance Prediction and Well Production Test Validation Using Artificial Intelligence; A New Milestone" SPE-173394, SPE Digital Energy Conf. and Ex., the Woodlands, Mar. 3-5, 2015; pp. 1-9.

(Continued)

*Primary Examiner* — Robert E Fuller
(74) *Attorney, Agent, or Firm* — Bracewell LLP; Constance G. Rhebergen; Brian H. Tompkins

(57) ABSTRACT

A choke valve system operable to obtain sand production measurements from a sand production sensor, compare the sand production measurements to a target sand production range for a current setting of a choke valve, and, in response to determining that the sand production measurements are outside of the target sand production range, adjust the setting of the choke valve in an effort to bring the sand production of the well into a target sand production range, and generate an alert regarding the out of range sand production measurements and the corresponding adjustment of the choke valve.

21 Claims, 4 Drawing Sheets

(56) References Cited

U.S. PATENT DOCUMENTS

| | | |
|---|---|---|
| 6,988,554 B2 | 1/2006 | Bodine et al. |
| 9,268,057 B2 | 2/2016 | Abitrabi et al. |
| 9,416,637 B2 | 8/2016 | Allouche |
| 9,988,866 B2 | 6/2018 | Cotten et al. |
| 10,047,578 B2 | 8/2018 | Lovorn et al. |
| 11,162,353 B2 | 11/2021 | Thiruvenkatanathan |
| 2008/0154510 A1 | 6/2008 | Scott |
| 2008/0262736 A1 | 10/2008 | Thigpen et al. |
| 2012/0330466 A1 | 12/2012 | Rodger |
| 2016/0298401 A1 | 10/2016 | Cotten et al. |
| 2017/0044876 A1 | 2/2017 | Romer et al. |
| 2018/0016897 A1 | 1/2018 | Willberg et al. |
| 2018/0119540 A1 | 5/2018 | Castillo |
| 2018/0240021 A1 | 8/2018 | Al-Harbi et al. |
| 2018/0306693 A1 | 10/2018 | Nazari et al. |
| 2018/0340416 A1 | 11/2018 | Nemoto et al. |
| 2019/0033898 A1 | 1/2019 | Shah et al. |
| 2019/0120044 A1 | 4/2019 | Langnes et al. |
| 2020/0386073 A1 | 12/2020 | Joubran et al. |

FOREIGN PATENT DOCUMENTS

| | | |
|---|---|---|
| EP | 1381921 B1 | 1/2004 |
| EP | 1585885 B1 | 10/2005 |
| EP | 3336303 A2 | 6/2018 |
| KR | 101902472 B1 | 11/2018 |
| WO | 2008079799 A2 | 7/2008 |
| WO | 2012134497 A1 | 10/2012 |
| WO | 2016057645 A1 | 4/2016 |
| WO | 2016118802 A1 | 7/2016 |
| WO | 2019040639 A1 | 2/2019 |
| WO | 2019110851 A1 | 6/2019 |
| WO | 2019118656 A1 | 6/2019 |

OTHER PUBLICATIONS

Elhaj, Murtada A. et al.; "Single Gas Flow Prediction Through Chokes Using Artificial Intelligence Techniques" SPE-177991-MS, SPE Saudi Arabia Section Annual Technical Symposium and Exhibition held in Al-Khobar, Apr. 21-23, 2015; pp. 1-14.

Elliott, Dave et al.; "Managed Pressure Drilling Erases the Lines" Oilfield Review, Spring 2011: 23, No. 1; pp. 14-23.

International Search Report and Written Opinion for International Application No. PCT/US2021/032289 (SA51458), dated Sep. 1, 2021; pp. 1-12.

Khamis, Mohammad et al.; "Optimization of choke size for two-phase flow using artificial intelligence" Journal of Petroleum Exploration and Production Technology, Aug. 7, 2019; pp. 1-14.

MiSWACO; "AUTOCHOKE drilling choke" MiSWACO a Schlumberger Company, 2014, pp. 1-3.

Nauduri, Anantha Sarat Sagar; "Managed Pressure Drilling Candidate Selection—A Dissertation" Graduate Studies of Texas A&M University, May 2009; pp. 1-134.

Okon, Anietie N. et al.; "Neural Network Models for Predicting Wellhead Pressure-Flow Rate Relationship for Niger Delta Oil Wells" Journal of Scientific Research & Reports 12(1), 2016; pp. 1-14.

Weatherford; "PressurePro Control System—Empowering your onshore drilling operations with accessible and accurate pressure-management technology" 2017; pp. 1-8.

SMART CHOKE VALVE TO REGULATE WELL SAND PRODUCTION

RELATED APPLICATIONS

This application is a continuation of U.S. patent application Ser. No. 15/930,895 filed on May 13, 2020 and titled "SMART CHOKE VALVE TO REGULATE WELL SAND PRODUCTION" which is hereby incorporated by reference.

FIELD

Embodiments relate generally to developing wells, and more particularly to regulating hydrocarbon production.

BACKGROUND

A well typically includes a wellbore (or a "borehole") that is drilled into the earth to provide access to a geologic formation that resides below the earth's surface (or a "subsurface formation"). A well may facilitate the extraction of natural resources, such as hydrocarbons and water, from a subsurface formation, facilitate the injection of substances into the subsurface formation, or facilitate the evaluation and monitoring of the subsurface formation. In the petroleum industry, hydrocarbon wells are often drilled to extract (or "produce") hydrocarbons, such as oil and gas, from subsurface formations.

Developing a hydrocarbon well for production typically involves several stages, such as a drilling stage, a completion stage and a production stage. The drilling stage involves drilling a wellbore into a portion of the formation that is expected to contain hydrocarbons (often referred to as a "hydrocarbon reservoir" or a "reservoir"). The drilling process is often facilitated by a drilling rig that sits at the earth's surface and that facilitates a variety of drilling operations, such as operating a drill bit to cut the wellbore. The completion stage involves operations for making the well ready to produce hydrocarbons, such as installing casing, installing production tubing, installing valves for regulating production flow, or pumping substances into the well to fracture, clean or otherwise prepare the reservoir and well to produce hydrocarbons. The production stage involves producing hydrocarbons from the reservoir by way of the well. During the production stage, the drilling rig is typically replaced with a production tree that includes valves that are operated, for example, to regulate pressure in the wellbore, to regulate production flow from the wellbore, or to provide access to the wellbore. The production tree typically includes an outlet that is connected to a distribution network of midstream facilities, such as tanks, pipelines or transport vehicles that transport production from the well to downstream facilities, such as refineries or export terminals.

The various stages of developing a hydrocarbon well can include a variety of challenges that are addressed to successfully develop the well. For example, during production operations, a well operator typically controls the rate of production from the well to optimize the overall production of hydrocarbons from the reservoir. The rate of production may be varied based on a number of factors, such as physical characteristics of the wellbore, the formation and production, and operations of nearby wells.

SUMMARY

Controlling a hydrocarbon well's production rate can be an important aspect of effectively and efficiently developing a hydrocarbon well. For example, holding a well's production rate at a relatively high level for an extended period of time can increase a risk of premature well depletion, water breakthrough, or other complications. On the other hand, holding a well's production at relatively low level for an extended period of time can reduce production and increase a marginal cost of production. In addition to these general considerations, a well operator may consider other factors. For example, most hydrocarbon production contains at least some amount of sand, which can cause additional complications in operating a well. For example, sand contained in production fluid (or "production") can plug portions of the wellbore, which can, in turn, inhibit the flow of hydrocarbon into the wellbore. Further, the erosive nature of sand contained in production fluid can wear well components, such as production tubing, valves and sensors. Accordingly, in can be important to monitor and regulate sand production while maintaining a desirable production rate.

Provided are systems and method for monitoring and regulating sand production of a hydrocarbon well. In some embodiments, a smart choke valve system of a hydrocarbon well is operable to automatically assess sand production measurements and make corresponding choke valve adjustments to regulate sand production of the well. For example, a smart choke valve system may include an integrated unit that includes a choke valve, a sand production sensor (e.g., a nanoparticle detector), and an onboard choke valve control system. The choke valve control system may be operable to perform the following operations for monitoring and regulating sand production: (a) obtain sand production measurements from the sand production sensor; (b) compare the sand production measurements obtained to a target sand production range for a current setting (or "position") of the choke valve; and (c) in response to determining that the sand production measurements obtained are outside of the target sand production range for the current setting of the choke valve: (i) automatically adjust the setting of the choke valve in an effort to bring the sand production of the well into a target sand production range; and (ii) generate an alert regarding the out of range sand production measurement and the corresponding adjustment of the choke valve.

In some embodiments, the choke valve control system employs a locally stored well profile to identify a target sand production range for a current setting of the choke valve. For example, the choke valve control system may store (e.g., in a local memory of the choke valve control system), a well profile that includes a mapping of settings of the choke valve to corresponding target sand production ranges. In some embodiments, the well profile is determined based on multi-rate testing of the well. For example, a well control system may control and monitor operation of the well under different settings of the choke valve to identify a corresponding set of well characteristics, such as a stabilized production rate, a stabilized pressure and a stabilized sand production of the well, at each of the of the choke valve settings. The localized operation of the smart choke valve system may provide a robust and flexible choke valve system that is capable of making sand production assessments and choke adjustments relatively quickly (e.g., without having to relay information and control signals to and from a well control system), which can, in turn, help to control and minimize the detrimental effects of sand production.

Provided in some embodiments is hydrocarbon carbon well system that includes the following: a smart choke valve system that is operable to regulate flow of production fluid from a wellbore of a hydrocarbon well, and including the following: a choke valve adapted to operate at different choke settings to regulate the flow of production fluid from the wellbore; a sand sensor adapted to sense amounts of sand production in production fluid flowing through the choke valve; and a choke valve control system adapted to control operation of the choke valve. The choke valve control system adapted to perform the following operations: obtain, from a well control system of the hydrocarbon well: a well profile for the well, the well profile including a sand production profile that defines a relationship of sand production of the hydrocarbon well to settings of the choke valve; and a first choke setting; control the choke valve to operate at the first choke setting; determine, based on the well profile, an upper sand production threshold that is indicative of a maximum amount of sand production for the first choke setting; determine, based on sand production measurements acquired by way of the sand sensor while the choke valve is operating at the first choke setting, a first amount of sand production of the well; determine whether the first amount of sand production is above the upper sand production threshold; and in response to determining that the first amount of sand production is above the upper sand production threshold: determine, based on the well profile, a second choke setting that corresponds to a second production flowrate that is less than a first production flowrate associated with the first choke setting; and control, in response to determining the second choke setting, the choke valve to operate at the second choke setting.

In some embodiments, the operations further include: determine, based on the well profile, a lower sand production threshold that is indicative of a minimum amount of sand production for the first choke setting; determine whether the first amount of sand production is below the lower sand production threshold; and in response to determining that the first amount of sand production is below the lower sand production threshold: determine, based on the well profile, a second choke setting corresponding to a second production flowrate that is greater than the first production flowrate associated with the first choke setting; and control, in response to determining the second choke setting, the choke valve to operate at the second choke setting. In certain embodiments, the sand sensor includes a nanoparticle detector adapted to sense amounts of sand production in production fluid flowing through the choke valve. In some embodiments, the operations further include: send, to the well control system, a sand production out of range alert that includes: an indication of the first amount of sand production being above the upper sand production threshold; and an indication of transitioning operation of the choke valve from operating at the first choke setting to operating at the second choke setting. In some embodiments, the choke valve control system includes a local memory and the well profile is stored in the local memory. In certain embodiments, the system further includes the well control system, and the well control system is adapted to: determine multi-rate test data for the well; and determine, based on the multi-rate test data for the well, the well profile for the well. In some embodiments, the well control system is adapted to conduct a multi-rate test of the well to generate the multi-rate test data for the well, and the multi-rate test of the well includes, for each of two or more of the different choke settings: operating the choke valve at the choke setting; and determining a corresponding sand production rate for the choke setting, where the well profile for the well is generated based on the sand production rates determined for the two or more of the different choke settings.

Provided in some embodiments is a method of operating hydrocarbon carbon well system. The method including the following: obtaining, by a choke valve control system of a smart choke valve system from a well control system of a hydrocarbon well: a well profile for the well (where the well profile includes a sand production profile that defines a relationship of sand production of the hydrocarbon well to settings of a choke valve of the smart choke valve system; and a first choke setting), controlling, by the choke valve control system, the choke valve to operate at the first choke setting; determining, by the choke valve control system based on the well profile, an upper sand production threshold that is indicative of a maximum amount of sand production for the first choke setting; determining, by the choke valve control system based on sand production measurements acquired by way of a sand sensor of the smart choke valve system while the choke is operating at the first choke setting, a first amount of sand production of the well; determining, by the choke valve control system, that the first amount of sand production is above the upper sand production threshold; and in response to determining that the first amount of sand production is above the upper sand production threshold, the choke valve control system: determining, based on the well profile, a second choke setting that corresponds to a second production flowrate that is less than a first production flowrate associated with the first choke setting; and controlling, in response to determining the second choke setting, the choke valve to operate at the second choke setting.

In some embodiments, the method further includes: determining, by the choke valve control system based on the well profile, a lower sand production threshold that is indicative of a minimum amount of sand production for the second choke setting; determining, by the choke valve control system based on sand production measurements acquired by way of the sand sensor of the smart choke valve system while the choke valve is operating at the second choke setting, a second amount of sand production of the well; determining that the second amount of sand production is below the lower sand production threshold; and in response to determining that the first amount of sand production is below the lower sand production threshold: determining, based on the well profile, a third choke setting corresponding to a third production flowrate that is greater than the second production flowrate associated with the second choke setting; and controlling, in response to determining the third choke setting, the choke valve to operate at the third choke setting. In certain embodiments, the sand sensor includes a nanoparticle detector adapted to sense amounts of sand production in production fluid flowing through the choke valve. In some embodiments, the method further includes: sending, by the choke valve control system to the well control system, a sand production out of range alert that includes: an indication of the first amount of sand production being above the upper sand production threshold; and an indication of transitioning operation of the choke valve from operating at the first choke setting to operating at the second choke setting. In certain embodiments, the choke valve control system includes a local memory and the method further includes storing, by the choke valve control system, the well profile in the local memory. In some embodiments, the method further includes the well control system: determining multi-rate test data for the well; and determining, based on the multi-rate test data for the well, the well profile for the well. In certain embodiments, the method further includes: conducting a multi-rate test of the well to generate the multi-rate test data for the well, where the multi-rate test of the well includes, for each of two or more of the different choke settings: operating the choke valve at the choke setting; and determining a corresponding sand production rate for the choke setting, where the well profile for the well is generated based on the sand production rates determined for the two or more of the different choke settings.

Provided in some embodiments is a non-transitory computer readable storage medium including program instructions stored thereon that are executable by a processor to perform the following operations for operating a hydrocarbon well: obtaining, by a choke valve control system of a smart choke valve system: a well profile for the well (the well profile including a sand production profile that defines a relationship of sand production of the hydrocarbon well to settings of a choke valve of the smart choke valve system); and a first choke setting, controlling, by the choke valve control system, the choke valve to operate at the first choke setting; determining, by the choke valve control system based on the well profile, an upper sand production threshold that is indicative of a maximum amount of sand production for the first choke setting; determining, by the choke valve control system based on sand production measurements acquired by way of a sand sensor of the smart choke valve system while the choke is operating at the first choke setting, a first amount of sand production of the well; determining, by the choke valve control system, that the first amount of sand production is above the upper sand production threshold; and in response to determining that the first amount of sand production is above the upper sand production threshold, the choke valve control system: determining, based on the well profile, a second choke setting that corresponds to a second production flowrate that is less than a first production flowrate associated with the first choke setting; and controlling, in response to determining the second choke setting, the choke valve to operate at the second choke setting.

In some embodiments, the operations further include: determining, by the choke valve control system based on the well profile, a lower sand production threshold that is indicative of a minimum amount of sand production for the second choke setting; determining, by the choke valve control system based on sand production measurements acquired by way of the sand sensor of the smart choke valve system while the choke valve is operating at the second choke setting, a second amount of sand production of the well; determining that the second amount of sand production is below the lower sand production threshold; and in response to determining that the first amount of sand production is below the lower sand production threshold: determining, based on the well profile, a third choke setting corresponding to a third production flowrate that is greater than the second production flowrate associated with the second choke setting; and controlling, in response to determining the third choke setting, the choke valve to operate at the third choke setting. In certain embodiments, the sand sensor includes a nanoparticle detector adapted to sense amounts of sand production in production fluid flowing through the choke valve. In some embodiments, the operations further include: sending, by the choke valve control system to a well control system, a sand production out of range alert that includes: an indication of the first amount of sand production being above the upper sand production threshold; and an indication of transitioning operation of the choke valve from operating at the first choke setting to operating at the second choke setting. In certain embodiments, the choke valve control system includes a local memory and the operations further include storing, by the choke valve control system, the well profile in the local memory. In some embodiments, the operations further include: determining multi-rate test data for the well; and determining, based on the multi-rate test data for the well, the well profile for the well. In certain embodiments, the operations further include: conducting a multi-rate test of the well to generate the multi-rate test data for the well, where the multi-rate test of the well includes, for each of two or more of the different choke settings: operating the choke valve at the choke setting; and determining a corresponding sand production rate for the choke setting, where the well profile for the well is generated based on the sand production rates determined for the two or more of the different choke settings.

Figure 1:
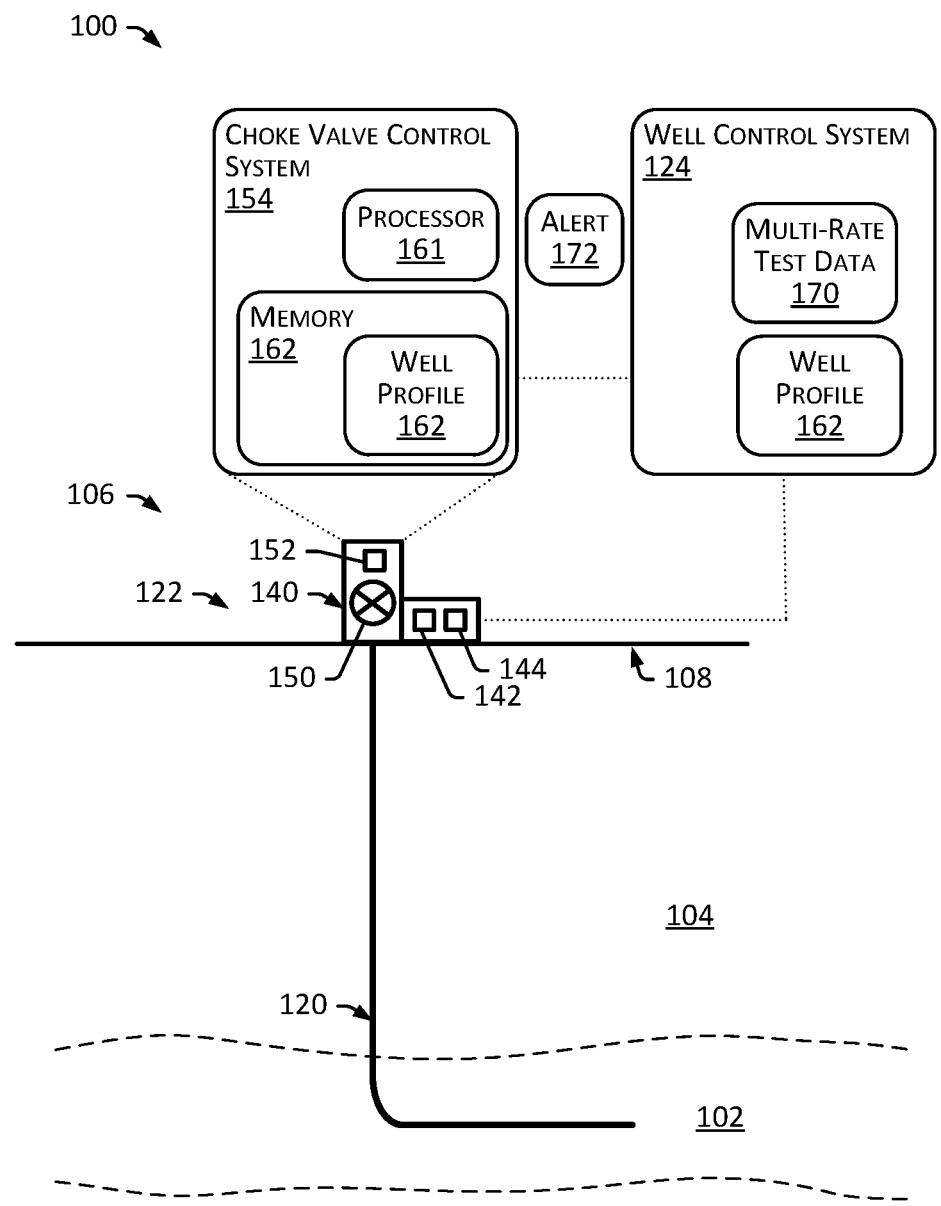
FIG. 1 is diagram that illustrates a well environment in accordance with one or more embodiments.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the scope of the present disclosure as defined by the claims.

DETAILED DESCRIPTION

Described are embodiments of novel systems and methods monitoring and regulating sand production of a hydrocarbon well. In some embodiment, a smart choke valve system of a hydrocarbon well is operable to automatically assess sand production measurements and make corresponding choke valve adjustments to regulate sand production of the well. For example, a smart choke valve system may include an integrated unit that includes a choke valve, a sand production sensor (e.g., a nanoparticle detector), and an onboard choke valve control system. The choke valve control system may be operable to perform the following operations for monitoring and regulating sand production: (a) obtain sand production measurements from the sand production sensor; (b) compare the sand production measurements obtained to a target sand production range for a current setting (or "position") of the choke valve; and (c) in response to determining that the sand production measurements obtained are outside of the target sand production range for the current setting of the choke valve: (i) automatically adjust the setting of the choke valve in an effort to bring the sand production of the well into a target sand production range; and (ii) generate an alert regarding the out of range sand production measurement and the corresponding adjustment of the choke valve.

In some embodiments, the choke valve control system employs a locally stored well profile to identify a target sand production range for a current setting of the choke valve. For example, the choke valve control system may store (e.g., in a local memory of the choke valve control system), a well profile that includes a mapping of settings of the choke valve to corresponding target sand production ranges. In some embodiments, the well profile is determined based on multi-rate testing of the well. For example, a well control system may control and monitor operation of the well under different settings of the choke valve to identify a corresponding set of well characteristics, such as a stabilized production rate, a stabilized pressure and a stabilized sand production of the well, at each of the of the choke valve settings. The localized operation of the smart choke valve system may provide a robust and flexible system that is capable of making sand production assessments and choke adjustments relatively quickly (e.g., without having to relay information and control signals to and from a well control system), which can, in turn, help to control and minimize the detrimental effects of sand production.

FIG. 1 is a diagram that illustrates a well environment 100 in accordance with one or more embodiments. In the illustrated embodiment, the well environment 100 includes a reservoir ("reservoir") 102 located in a subsurface formation ("formation") 104 and a well system ("well") 106.

The formation 104 may include a porous or fractured rock formation that resides beneath the Earth's surface (or "surface") 108. The reservoir 102 may be a hydrocarbon reservoir defined by a portion of the formation 104 that contains (or that is at least determined to or expected to contain) a subsurface pool of hydrocarbons, such as oil and gas. The formation 104 and the reservoir 102 may each include different layers of rock having varying characteristics, such as varying degrees of permeability, porosity, and fluid saturation. In the case of the well 106 being operated as a production well, the well 106 may be a hydrocarbon production well that is operable to facilitate the extraction of hydrocarbons (or "production") from the reservoir 102.

The well 106 may include a wellbore 120, a production system 122, and a well control system ("control system") 124. The wellbore 120 may be, for example, a bored hole that extends from the surface 108 into a target zone of the formation 104, such as the reservoir 102. The wellbore 120 may be created, for example, by a drill bit boring through the formation 104 and the reservoir 102. An upper end of the wellbore 120 (e.g., located at or near the surface 108) may be referred to as the "up-hole" end of the wellbore 120. A lower end of the wellbore 120 (e.g., terminating in the formation 104) may be referred to as the "down-hole" end of the wellbore 120.

In some embodiments, the production system 122 includes devices that facilitate that extraction of production from the reservoir 102 by way of the wellbore 120. For example, in the illustrated embodiment, the production system 130 includes a smart choke valve system ("choke valve system") 140, a flowrate sensor 142, and a pressure sensor 144. In some embodiments, the flowrate sensor 142 is operable to measure the rate of the flow of production from the well 106. For example, the flowrate sensor 142 may be a flowmeter (e.g., a surface flowmeter located at production tree of the well 106) that measures the flowrate of production exiting the wellbore 120. The flowrate of production may be referred to as the "production rate" of the well 106. In some embodiments, the pressure sensor 144 is operable to measure pressure in the wellbore 120 of the well 106. For example, the pressure sensor 144 may be a surface pressure sensor that measures the pressure in the up-hole end of the wellbore 120 (e.g., a wellhead pressure sensor that measures wellhead pressure (WHP), $P_{wh}$), or a down-hole pressure sensor that measures the pressure in a lower portion of the wellbore 120 (e.g., a bottom hole pressure sensor that measures bottom hole pressure (BHP), $P_{bh}$). The pressure of the wellbore 120 may be referred to as the "well pressure" of the well 106.

In some embodiments, the choke valve system 140 includes an integrated measurement and control system that is operable to automatically monitor and regulate the flow of production from the wellbore 120. For example, in the illustrated embodiment, the choke valve system 140 includes a choke valve 150, a sand production sensor 152, and a choke valve control system 154. In some embodiments, the choke valve system 140 is a unitary system that includes the choke valve 150, the sand production sensor 152, and the choke valve control system 154 physically coupled to one another or otherwise integrated together as a unit. For example, choke valve system 140 may include a unit that is a component of a production tree that is coupled to a wellhead of the well 106.

In some embodiments, the choke valve 150 includes a valve that is operable in different choke positions (or "settings" or "states") to regulate the flow of production through the choke valve system 140. For example, the choke valve 150 may be operable to actuate between a fully-opened position and fully-closed position. The fully-opened position may, for example, include opening an entire flow area of the choke valve 150 to facilitate the flow of substances, such as production, across the choke valve 150. The fully-closed position may include closing the entire flow area of the choke valve 150 to fully inhibit (or "block") the flow of substances across the choke valve 150. The choke valve 150 may have one or more partially-opened positions that can be utilized to regulate (or "choke") the flow of substances through the choke valve 150. For example, the choke valve 150 may have eleven positions, 0-10, with position 0 being a 0% open position (or a "fully-closed" position), each of positions 1-9 providing sequentially increasing degrees of opening of the flow area of the choke valve 150, and state 10 being a 100% open position (or a "fully-opened" position). The operational position of the choke valve 150 may be dictated by a variety of factors, such as a desired production rate, pressure, or sand production of the well 106. In some embodiments, the choke valve control system 154 controls operation of the choke valve 150. For example, the choke valve control system 154 may control operation of an actuator that sets the choke valve 150 in a given position.

In some embodiments, the sand production sensor 152 includes a sensor that is operable to sense physical quantities of sand contained in production flowing through the choke valve system 140. For example, the sand production sensor 152 may include a nanoparticle detector or an acoustic particle detector that is operable to sense an amount of sand contained in production that flows through the choke valve 150 and the wellbore 120. A nanoparticle sensor may, for example, include an electromechanical nanosensor that detects resistance change upon a nanomaterial as a result of sand particles passing by the nanomaterial. In some embodiments, the sand production sensor 152 is located downstream of the choke valve 150. For example, the sand production sensor 152 may be located adjacent an exit of the choke valve 150 to sense an amount of sand contained in the production after it passes through the choke valve 150. In some embodiments, the sand production sensor 152 is located upstream of the choke valve 150. For example, the sand production sensor 152 may be located adjacent an entrance of the choke valve 150 to sense an amount of sand contained in the production before it passes through the choke valve 150. In some embodiments, the choke valve control system 154 controls and monitors operation of the sand production sensor 152. For example, the choke valve control system 154 may activate the sand production sensor 152 to sense amounts of sand contained in the production and collect, from the sand production sensor 152, corresponding measurements of sand production.

In some embodiments, the choke valve control system 154 is operable to control various operations of the choke valve system 140. For example, the choke valve control system 154 may include a local choke valve memory and a local choke valve processor that are located onboard the choke valve system 140 and that are capable of performing the various processing and control operations of the choke valve control system 154 described here, locally. In some embodiments, the choke valve control system 154 includes a computer system that is the same as or similar to that of computer system 1000 described with regard to at least FIG. 4.

In some embodiments, the well control system 124 is operable to control various operations of the well 106, such as well drilling operations, well completion operations, well production operations, or well or formation monitoring operations. For example, the well control system 124 may include a well system memory and a well system processor that are capable of performing the various processing and control operations of the well control system 124 described here. In some embodiments, the well control system 142 includes a supervisory control and data acquisition (SCADA) computer system that is operable to monitor well devices. For example, the well control system 142 may include a SCADA computer system that is operable to monitor measurements obtained by way of the of the sand production sensor 152, the flowrate sensor 142, and the pressure sensor 144, process the measurements, and issue, to the choke valve system 140, corresponding commands for controlling the choke valve 150 in real-time (e.g., within 1 minute of acquisition of the corresponding data). This may provide for real-time operational control of the choke valve 150 and sand production based on corresponding measures of sand production. In some embodiments, the well control system 124 includes a computer system that is the same as or similar to that of computer system 1000 described with regard to at least FIG. 4.

In some embodiments, the choke valve system 140 is operable to automatically assess sand production measurements and make corresponding choke valve adjustments to regulate sand production of the well 106. For example, the choke valve system 140 may be operable to perform the following operations for monitoring and regulating sand production of the well 106: (a) obtain sand production measurements from the sand production sensor 152; (b) compare the sand production measurements obtained to a target sand production range for a current position (or "setting") of the choke valve 150; and (c) in response to determining that the sand production measurements obtained are outside of the target sand production range for the current position of the choke valve 150: (i) automatically adjust the setting of the choke valve 150 in an effort to bring the sand production of the well 106 into a target sand production range; and (ii) generate an alert regarding the out of range sand production measurement and the corresponding adjustment of the position of the choke valve 150.

Figure 2:
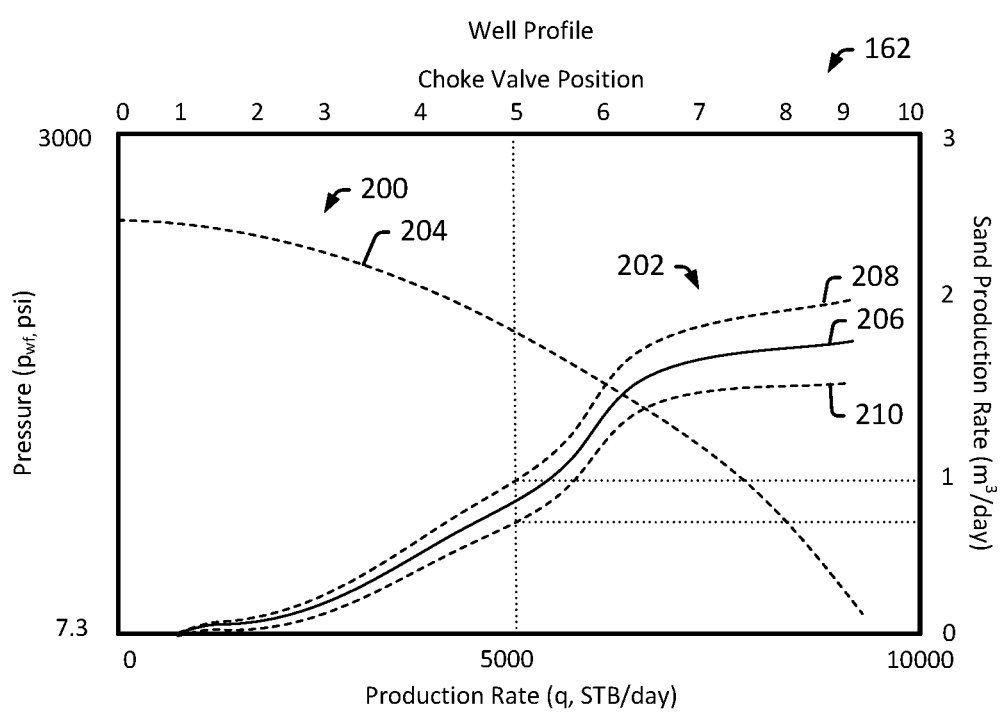
FIG. 2 is a diagram that illustrates an example well profile in accordance with one or more embodiments.

In some embodiments, the choke valve control system 154 employs a locally stored well profile that is used to identify the target sand production range for a current position of the choke valve 150. For example, the choke valve control system may store (e.g., in a local memory 160 of the choke valve control system 154, a well profile 162 that includes a mapping of settings of the choke valve 150 to corresponding target sand production ranges. FIG. 2 is a diagram that illustrates an example well profile 162 in accordance with one or more embodiments. In the illustrated embodiment, the well profile 162 includes a pressure profile 200 and a corresponding sand production profile 202. The pressure profile 200 may include a baseline pressure curve 204 that defines a relationship of well pressure to production rate (or choke position) for the well 106. The sand production profile 202 may include baseline sand production curve 206 that defines a relationship of sand production to choke position (or production rate) for the well 106. As illustrated, the pressure profile 200 may indicate a general decrease in well pressure with increased production rate for the well 106. As illustrated, the sand production profile 202 may indicate a general increase in sand production with increased production rate for the well 106.

In some embodiments, the well profile 162 includes target sand production ranges for different production rates. For example, referring to FIG. 2, the well profile 162 may include an upper sand production threshold curve 208 and a lower sand production threshold curve 210. The upper sand production threshold curve 208 may define maximum values of sand production for corresponding choke positions (or production rates) for the well 106. The lower sand production threshold curve 210 may define minimum values of sand production for corresponding choke positions (or production rates) for the well 106. Thus, for example, upper and lower sand production values for a target sand production range for a given choke position (or production rate) may be defined by respective values of the upper and lower sand production threshold curves 208 and 210 at the given choke position (or production rate). For example, referring to FIG. 2, a target sand production range for a choke position of 5 (or a production rate of about 5000 STB/day) may be about 0.75-0.90 cubic meters per day (m³/day), which is defined by an upper sand production threshold of about 0.90 m³/day and a lower sand production threshold of about 0.75 m³/day at the choke position of 5 (or a production rate of about 5000 STB/day).

In some embodiments, the sand production ranges are determined as a percentage (e.g., +/−10%) of the corresponding sand production rate. For example, the upper sand production threshold curve 208 may be defined as 110% of the baseline sand production curve 206 and the lower sand production threshold curve 210 may be defined as 90% of the baseline sand production curve 206. In some embodiments, the sand production ranges may be defined as an offset (e.g., +/−0.1 STB/day) from the corresponding sand production rate. For example, the upper sand production threshold curve 208 may be defined as a curve offset by +0.1 STB/day from the baseline sand production curve 206 and the lower sand production threshold curve 210 may be defined as a curve offset by −0.1 STB/day from the baseline sand production curve 206.

In some embodiments, the well profile 162 is based on observed performance of the well 106 under a variety of different choke positions (or production rates). For example, the baseline pressure curve 204 and the sand production profile 202 may be determined based on observed values of well pressure and sand production while the well 106 is operated at different choke positions (or production rates) across a range of choke positions (or production rates). In some embodiments, the well profile 162 is determined based on multi-rate testing of the well 106. Multi-rate testing of the well 106 may include, for example, (1) for each of some or all of the open positon and the partially opened positons of the choke valve 150, the well control system 124 (a) commanding the choke valve control system 154 to operate the choke valve 150 in the choke position until the production rate of the well 106 has stabilized (e.g., is not varying more than +/−5% from an average production rate) with the choke valve 150 in the position, and (b) in response to determining that production rate has stabilized with the choke valve 150 in the position: (i) obtaining, from the choke valve control system 154, a corresponding measurement of sand production for the well 106 for the choke position and stabilized production rate (e.g., acquired by way of the sand production sensor 152 of the choke valve control system 154), (ii) obtaining a corresponding measurement of the stabilized production rate for the well 106 for the choke position (e.g., acquired by way of the flowrate sensor 142), and (iii) obtaining a corresponding measurement of well pressure for the well 106 for the choke position and stabilized production rate (e.g., acquired by way of the pressure sensor 144). The well control system 124 may collect and store multi-rate test data 170 that includes the acquired data for the different choke position and production rates, and determine, based on the multi-rate test data, a corresponding pressure profile 200 and a corresponding sand production profile 202, based on the obtained measurements. For example, the well control system 124 may determine the well profile 162 of FIG. 2 based on multi-rate test data.

Figure 3:
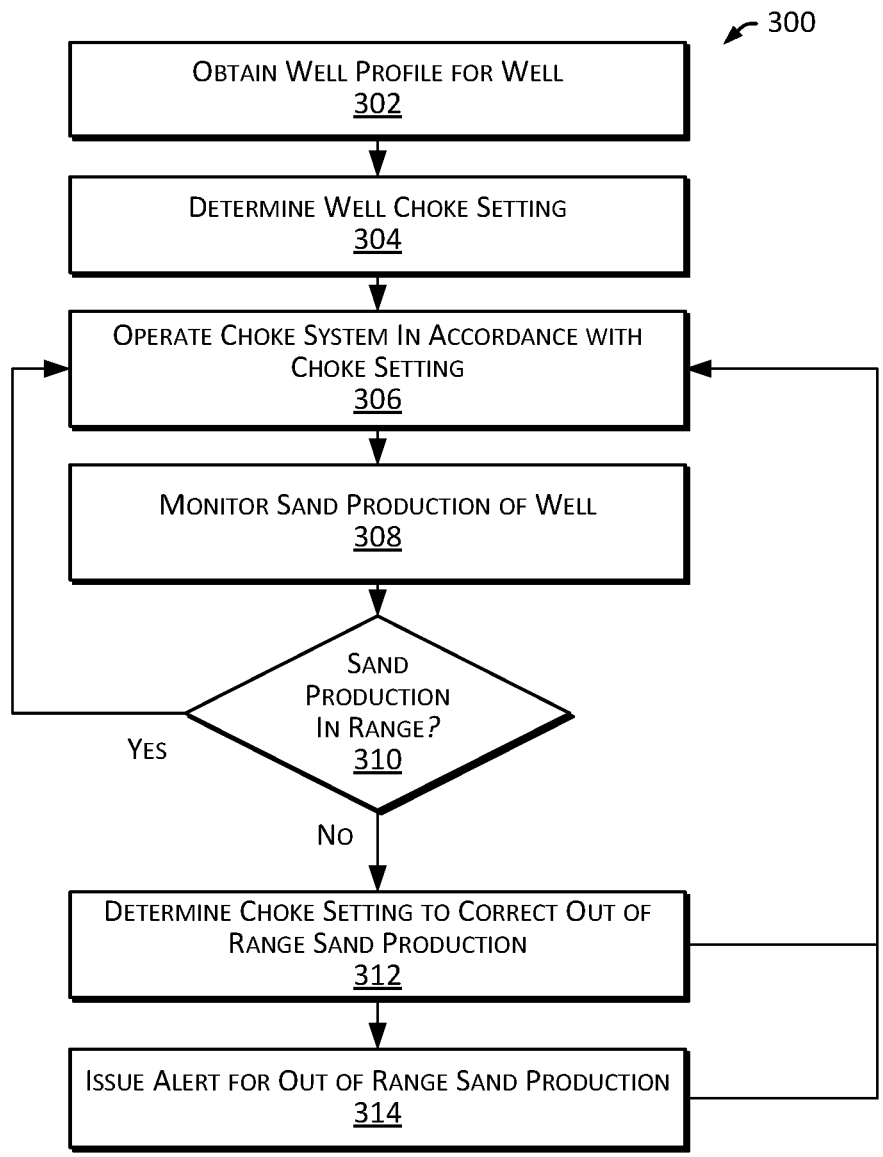
FIG. 3 is a flowchart that illustrates a method of operating a well in accordance with one or more embodiments.

FIG. 3 is a flowchart that illustrates a method 300 of operating a hydrocarbon well in accordance with one or more embodiments. In the context of the well 106, some or all of the operations of method 300 may be performed by the choke valve control system 154, the well control system 124, or another well operator.

In some embodiments, method 300 includes obtaining a well profile for a well (block 302). This may include a choke valve system obtaining a well profile that is indicative of a relationship of sand production to production rate for a well. For example, obtaining a well profile for the well 106 may include the choke valve control system 154 obtaining, from the well control system 124, the well profile 162 depicted in FIG. 2. For example, the well control system 124 may conduct a multi-rate test of the well 106 to acquire multi-rate test data 170, generate the well profile 162 of FIG. 2 based on the multi-rate test data 170 acquired, and send (or "download") the well profile 162 to the choke valve control system 154. The choke valve control system 154 may, in turn, store the well profile 162 in its local memory 160.

In some embodiments, method 300 includes determining a well choke setting for the well (block 304). This may include the choke valve system obtaining, or otherwise determining, a choke valve positon that the choke valve system is to be operated in. For example, determining a well choke setting may include the choke valve control system 154 receiving, from the well control system 124, a command to operate the choke valve 150 in positon 5 and, in response, determining that the choke valve 150 is to be operated in positon 5.

In some embodiments, method 300 includes operating the choke system in accordance with the choke setting (block 306). This may include the choke valve system controlling the choke valve to operate in the determined choke valve position. For example, operating the choke valve system 140 in accordance with the choke setting may include the choke valve control system 154 controlling the choke valve 150 to operate in positon 5.

In some embodiments, method 300 includes monitoring sand production of the well (block 308). This may include the choke valve system monitoring sand production measurements obtained by way of a sand production sensor. For example, monitoring sand production of the well 106 may include the choke valve control system 154 monitoring sand production measurements obtained by way of the sand production sensor 152 while the choke valve 150 is operating in positon 5 and the production rate of the well 106 is stable.

In some embodiments, method 300 includes determining whether a current sand production of the well is within a sand production range for the current choke setting (block 310). This may include the choke valve system determining whether a currently observed sand production measurement falls within upper and lower sand production thresholds for the current choke valve position. For example, determining whether a current sand production of the well is within a sand production range for the current choke setting may include the choke valve control system 154 determining, based on the well profile 162 (e.g., stored locally in memory 160), a target sand production range of 0.75-0.90 m$^3$/day for the choke position of 5 (e.g., defined by a upper sand production threshold of about 0.90 m$^3$/day and a lower sand production threshold of about 0.75 m$^3$/day for the choke position of 5), and comparing a current (or "latest") measurement sand production to the range of 0.75-0.90 m$^3$/day.

In some embodiments, method 300 includes, in response to determining that current sand production of the well in within the sand production range, continuing to operate the choke system in accordance with the current choke setting, monitoring sand production of the well and determining whether the sand production of the well remains within the sand production range (e.g., at blocks 306, 308 and 310). For example, in response to the choke valve control system 154 determining that the current sand production of the well 106 is 0.80 m$^3$/day, the choke valve control system 154 may determine that the current sand production is within the sand production range of 0.75-0.90 m$^3$/day for the current choke valve position of 5.

In some embodiments, method 300 includes, in response to determining that the current sand production of the well in not within the sand production range (e.g., the current sand production of the well out of the sand production range), proceeding to taking corrective measures. The corrective measure may include determining a choke setting (or "updated" choke setting) to correct the out of range sand production (block 312), generating an alert for the out of range sand production (block 314) and continuing to operate the choke system in accordance with the "updated" choke setting (block 306, 308 and 310). In some embodiments, determining a choke setting to correct the out of range sand production may include, in response to determining that the current sand production of the well exceeds the upper sand production threshold for the current choke valve position, determining a next choke setting that is associated with a decreased production rate. For example, in response to the choke valve control system 154 determining that the current sand production of the well 106 is 0.95 m$^3$/day, the choke valve control system 154 may determine that the current sand production exceeds the upper sand production threshold of 0.90 m$^3$/day for the current choke valve position of 5, and may, in response, identify the choke position of 4 (which is the next choke position associated with a lower production rate). In accordance with the method 300, the choke valve control system 154 may continuing to operate the choke system in accordance with the "updated" choke position 4 (block 306, 308 and 310). In some embodiments, determining a choke setting to correct the out of range sand production may include, in response to determining that the current sand production of the well is below the lower sand production threshold for the current choke valve position, determining a next choke setting that is associated with an increased production rate. For example, in response to the choke valve control system 154 determining that the current sand production of the well 106 is 0.70 m$^3$/day, the choke valve control system 154 may determine that the current sand production is below the lower sand production threshold of 0.75 m$^3$/day for the current choke valve position of 5, and may, in response, identify the choke position 6 (which is the next choke position associated with a higher production rate). In accordance with the method 200, the choke valve control system 154 may continue to operate the choke system in accordance with the "updated" choke position 6 (block 306, 308 and 310).

In some embodiments, generating an alert for the out of range sand production (block 314) includes generating an alert to notify other entities of the well system 106 that the out of range condition has occurred or corrective action taken. For example, in response to the choke valve control system 154 determining that the current sand production of the well 106 is 0.9 m$^3$/day, the choke valve control system 154 may determine that the current sand production exceeds the upper sand production threshold of 0.90 m$^3$/day for the current choke valve position of 5, identify the updated choke position 4, control the choke valve 150 to transition to operation in choke setting 4, and send, to the well control system 124, a sand production out of range alert 172 that indicates the date and time of the out of range sand production measurement (e.g., Jan. 1, 2020 at 2:00 am), the out of range measurement (e.g., 0.95 m$^3$/day), the threshold violated (e.g., 0.90 m$^3$/day), the choke setting associated with the violation (e.g., choke position 5) and corrective action taken (e.g., transition from choke position 5 to choke position 4 on Jan. 1, 2020 at 2:01 am). The localized operation of the smart choke valve system 140 may provide a robust and flexible well choke system that is capable of making sand production assessments and choke adjustments relatively quickly (e.g., without having to relay information and control signals between the choke valve system 140 and the well control system 124), which can, in turn, help to control and minimize the detrimental effects of sand production on components of the well 106.

Figure 4:
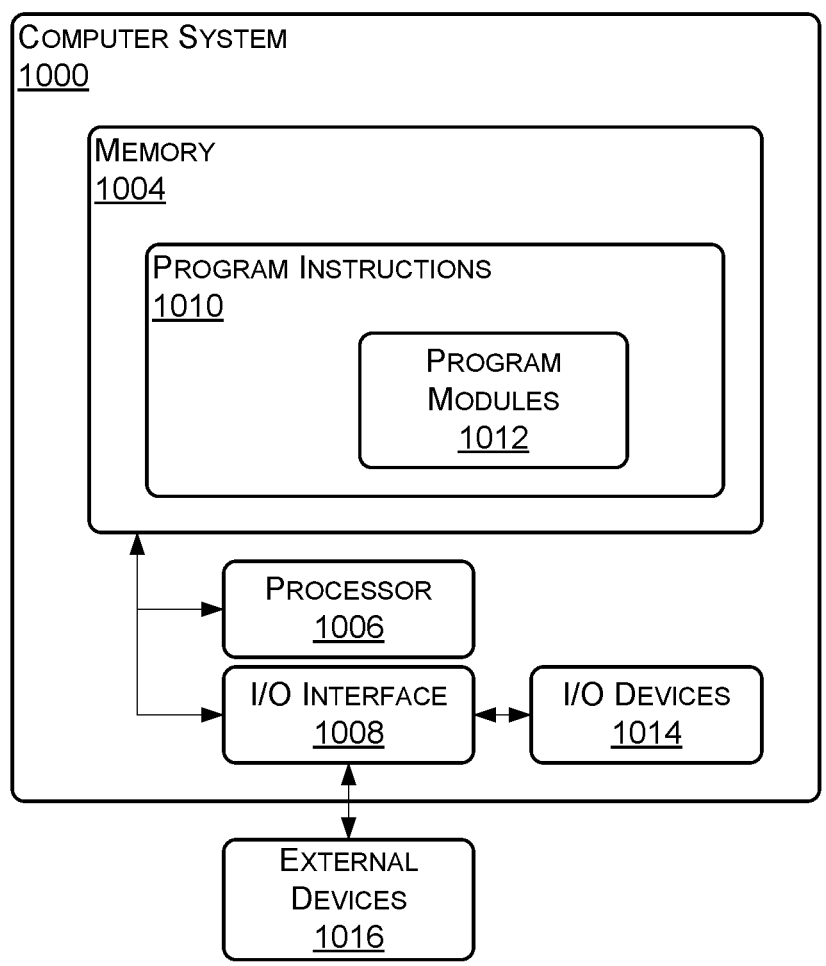
FIG. 4 is a diagram that illustrates an example computer system in accordance with one or more embodiments.

FIG. 4 is a diagram that illustrates an example computer system (or "system") 1000 in accordance with one or more embodiments. In some embodiments, the system 1000 is a programmable logic controller (PLC). The system 1000 may include a memory 1004, a processor 1006 and an input/output (I/O) interface 1008. The memory 1004 may include non-volatile memory (for example, flash memory, read-only memory (ROM), programmable read-only memory (PROM), erasable programmable read-only memory (EPROM), electrically erasable programmable read-only memory (EEPROM)), volatile memory (for example, random access memory (RAM), static random access memory (SRAM), synchronous dynamic RAM (SDRAM)), or bulk storage memory (for example, CD-ROM or DVD-ROM, hard drives). The memory 1004 may include a non-transitory computer-readable storage medium having program instructions 1010 stored thereon. The program instructions 1010 may include program modules 1012 that are executable by a computer processor (for example, the processor 1006) to cause the functional operations described, such as those described with regard to the well control system 124 (or another operator of the well 106), the choke valve control system 154, or the method 300.

The processor 1006 may be any suitable processor capable of executing program instructions. The processor 1006 may include a central processing unit (CPU) that carries out program instructions (for example, the program instructions of the program modules 1012) to perform the arithmetical, logical, or input/output operations described. The processor 1006 may include one or more processors. The I/O interface 1008 may provide an interface for communication with one or more I/O devices 1014, such as a joystick, a computer mouse, a keyboard, or a display screen (for example, an electronic display for displaying a graphical user interface (GUI)). The I/O devices 1014 may include one or more of the user input devices. The I/O devices 1014 may be connected to the I/O interface 1008 by way of a wired connection (for example, an Industrial Ethernet connection) or a wireless connection (for example, a Wi-Fi connection). The I/O interface 1008 may provide an interface for communication with one or more external devices 1016. In some embodiments, the I/O interface 1008 includes one or both of an antenna and a transceiver. The external devices 1016 may include, for example, the choke valve 150, the sand production sensor 152, the choke valve system 140, the flowrate sensor 142, or the pressure sensor 144.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

It will be appreciated that the processes and methods described here are example embodiments of processes and methods that may be employed in accordance with the techniques described here. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination of software and hardware. Some or all of the portions of the processes and methods may be implemented by one or more of the processors/modules/applications described here.

As used throughout this application, the word "may" is used in a permissive sense (that is, meaning having the potential to), rather than the mandatory sense (that is, meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on"

data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (for example, by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A hydrocarbon well system comprising:
    a smart choke valve system that is configured to regulate flow of production fluid from a wellbore of a hydrocarbon well, the smart choke valve system comprising:
        a choke valve configured to operate at different choke settings to regulate the flow of production fluid from the wellbore;
        a sand sensor configured to sense amounts of sand production in production fluid flowing through the choke valve; and
        a choke valve control system configured to control operation of the choke valve, the choke valve control system configured to perform the following operations:
            obtain, from a well control system of the hydrocarbon well:
                a well profile for the well, the well profile comprising a sand production profile that defines a relationship of sand production of the hydrocarbon well to settings of the choke valve; and
                a first choke setting;
            control the choke valve to operate at the first choke setting;
            determine, based on the well profile, a lower sand production threshold that is indicative of a minimum amount of sand production for the first choke setting;
            determine, based on sand production measurements acquired by way of the sand sensor while the choke valve is operating at the first choke setting, a first amount of sand production of the well;
            determine whether the first amount of sand production is below the lower sand production threshold; and
            in response to determining that the first amount of sand production is below the lower sand production threshold:
                determine, based on the well profile, a second choke setting that corresponds to a second production flowrate that is greater than a first production flowrate associated with the first choke setting; and
                control, in response to determining the second choke setting, the choke valve to operate at the second choke setting.

2. The system of claim 1, wherein the choke valve control system is further configured to perform the following operations:
    determine, based on the well profile, an upper sand production threshold that is indicative of a maximum amount of sand production for the first choke setting;
    determine whether the first amount of sand production is above the lower sand production threshold; and
    in response to determining that the first amount of sand production is above the lower sand production threshold:
        determine, based on the well profile, a third choke setting corresponding to a third production flowrate that is less than the first production flowrate associated with the first choke setting; and
        control, in response to determining the third choke setting, the choke valve to operate at the third choke setting.

3. The system of claim 1, wherein the sand sensor comprises a nanoparticle detector configured to sense amounts of sand production in production fluid flowing through the choke valve.

4. The system of claim 1, wherein the choke valve control system is further configured to perform the following operations:
    send, to the well control system, a sand production out of range alert that comprises:
        an indication of the first amount of sand production being below the lower sand production threshold; and
        an indication of transitioning operation of the choke valve from operating at the first choke setting to operating at the second choke setting.

5. The system of claim 1, wherein the choke valve control system comprises a local memory and wherein the well profile is stored in the local memory.

6. The system of claim 1, further comprising the well control system, wherein the well control system is configured to:
    determine multi-rate test data for the well; and
    determine, based on the multi-rate test data for the well, the well profile for the well.

7. The system of claim 6, wherein the well control system is configured to conduct a multi-rate test of the well to generate the multi-rate test data for the well, wherein the multi-rate test of the well comprises, for each of two or more of the different choke settings:
    operating the choke valve at the choke setting; and
    determining a corresponding sand production rate for the choke setting,
    wherein the well profile for the well is generated based on the sand production rates determined for the two or more of the different choke settings.

8. A method of operating a hydrocarbon well system comprising:
    obtaining, by a choke valve control system of a smart choke valve system from a well control system of a hydrocarbon well:
        a well profile for the well, the well profile comprising a sand production profile that defines a relationship of sand production of the hydrocarbon well to settings of a choke valve of the smart choke valve system; and
        a first choke setting,
    controlling, by the choke valve control system, the choke valve to operate at the first choke setting;

determining, by the choke valve control system based on the well profile, a lower sand production threshold that is indicative of a minimum amount of sand production for the first choke setting;

determining, by the choke valve control system based on sand production measurements acquired by way of a sand sensor of the smart choke valve system while the choke is operating at the first choke setting, a first amount of sand production of the well;

determining, by the choke valve control system, that the first amount of sand production is below the lower sand production threshold; and in response to determining that the first amount of sand production is below the lower sand production threshold, the choke valve control system:

determining, based on the well profile, a second choke setting that corresponds to a second production flowrate that is greater than a first production flowrate associated with the first choke setting; and controlling, in response to determining the second choke setting, the choke valve to operate at the second choke setting.

9. The method of claim 8, further comprising:

determining, by the choke valve control system based on the well profile, an upper sand production threshold that is indicative of a maximum amount of sand production for the second choke setting;

determining, by the choke valve control system based on sand production measurements acquired by way of the sand sensor of the smart choke valve system while the choke valve is operating at the second choke setting, a second amount of sand production of the well;

determining that the second amount of sand production is above the upper sand production threshold; and in response to determining that the first amount of sand production is above the upper sand production threshold:

determining, based on the well profile, a third choke setting corresponding to a third production flowrate that is less than the second production flowrate associated with the second choke setting; and controlling, in response to determining the third choke setting, the choke valve to operate at the third choke setting.

10. The method of claim 8, wherein the sand sensor comprises a nanoparticle detector configured to sense amounts of sand production in production fluid flowing through the choke valve.

11. The method of claim 8, wherein the method further comprises:

sending, by the choke valve control system to the well control system, a sand production out of range alert that comprises:

an indication of the first amount of sand production being below the lower sand production threshold; and an indication of transitioning operation of the choke valve from operating at the first choke setting to operating at the second choke setting.

12. The method of claim 8, wherein the choke valve control system comprises a local memory and wherein the method further comprises:

storing, by the choke valve control system, the well profile in the local memory.

13. The method of claim 8, further comprising the well control system:

determining multi-rate test data for the well; and determining, based on the multi-rate test data for the well, the well profile for the well.

14. The method of claim 13, further comprising:

conducting a multi-rate test of the well to generate the multi-rate test data for the well, wherein the multi-rate test of the well comprises, for each of two or more of the different choke settings:

operating the choke valve at the choke setting; and determining a corresponding sand production rate for the choke setting, wherein the well profile for the well is generated based on the sand production rates determined for the two or more of the different choke settings.

15. A non-transitory computer readable storage medium comprising program instructions stored thereon that are executable by a processor to perform the following operations for operating a hydrocarbon well:

obtaining, by a choke valve control system of a smart choke valve system:

a well profile for the well, the well profile comprising a sand production profile that defines a relationship of sand production of the hydrocarbon well to settings of a choke valve of the smart choke valve system; and a first choke setting, controlling, by the choke valve control system, the choke valve to operate at the first choke setting;

determining, by the choke valve control system based on the well profile, a lower sand production threshold that is indicative of a minimum amount of sand production for the first choke setting;

determining, by the choke valve control system based on sand production measurements acquired by way of a sand sensor of the smart choke valve system while the choke is operating at the first choke setting, a first amount of sand production of the well;

determining, by the choke valve control system, that the first amount of sand production is below the lower sand production threshold; and in response to determining that the first amount of sand production is below the lower sand production threshold, the choke valve control system:

determining, based on the well profile, a second choke setting that corresponds to a second production flowrate that is less than a first production flowrate associated with the first choke setting; and controlling, in response to determining the second choke setting, the choke valve to operate at the second choke setting.

16. The medium of claim 15, wherein the operations further comprise:

determining, by the choke valve control system based on the well profile, an upper sand production threshold that is indicative of a maximum amount of sand production for the second choke setting;

determining, by the choke valve control system based on sand production measurements acquired by way of the sand sensor of the smart choke valve system while the choke valve is operating at the second choke setting, a second amount of sand production of the well;

determining that the second amount of sand production is above the upper sand production threshold; and in response to determining that the first amount of sand production is above the upper sand production threshold:

determining, based on the well profile, a third choke setting corresponding to a third production flowrate that is less than the second production flowrate associated with the second choke setting; and controlling, in response to determining the third choke setting, the choke valve to operate at the third choke setting.

17. The medium of claim 15, wherein the sand sensor comprises a nanoparticle detector configured to sense amounts of sand production in production fluid flowing through the choke valve.

18. The medium of claim 15, wherein the operations further comprise:

sending, by the choke valve control system to a well control system, a sand production out of range alert that comprises:

an indication of the first amount of sand production being below the lower sand production threshold; and an indication of transitioning operation of the choke valve from operating at the first choke setting to operating at the second choke setting.

19. The medium of claim 15, wherein the choke valve control system comprises a local memory and the operations further comprising:

storing, by the choke valve control system, the well profile in the local memory.

20. The medium of claim 15, wherein the operations further comprise:

determining multi-rate test data for the well; and determining, based on the multi-rate test data for the well, the well profile for the well.

21. The medium of claim 20, wherein the operations further comprise:

conducting a multi-rate test of the well to generate the multi-rate test data for the well, wherein the multi-rate test of the well comprises, for each of two or more of the different choke settings:

operating the choke valve at the choke setting; and determining a corresponding sand production rate for the choke setting, wherein the well profile for the well is generated based on the sand production rates determined for the two or more of the different choke settings.

\* \* \* \* \*